2,703,069

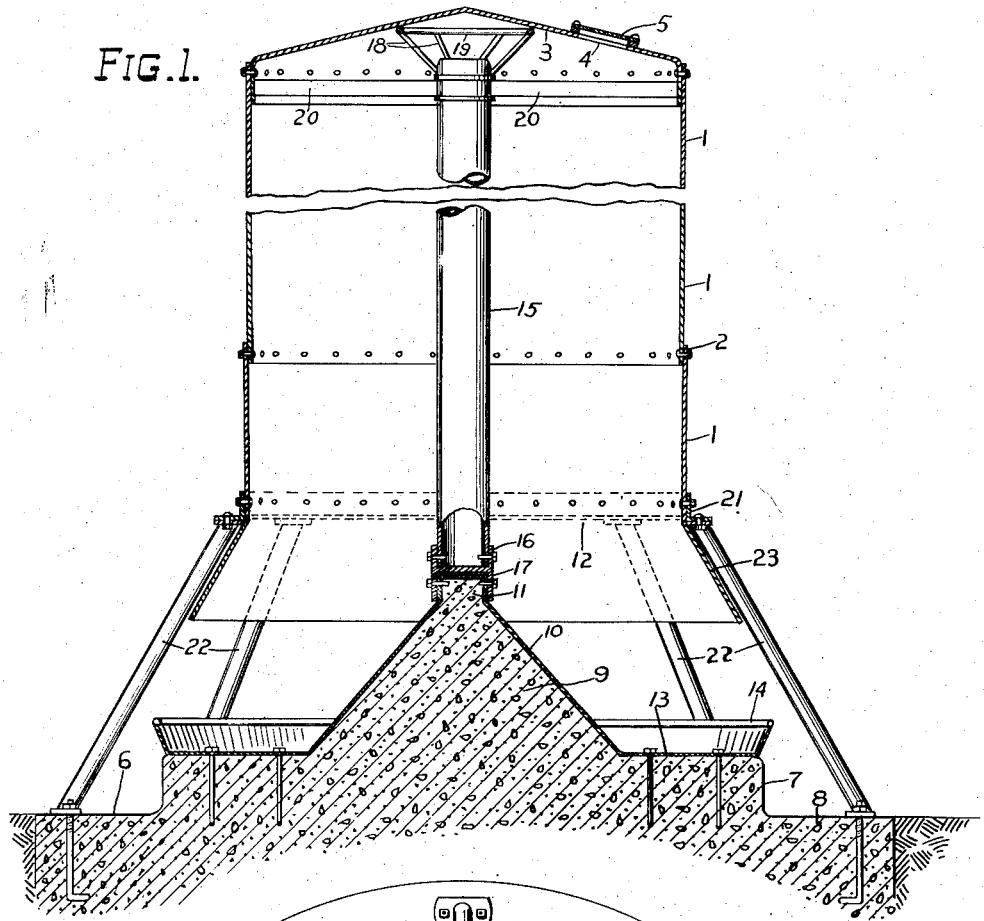
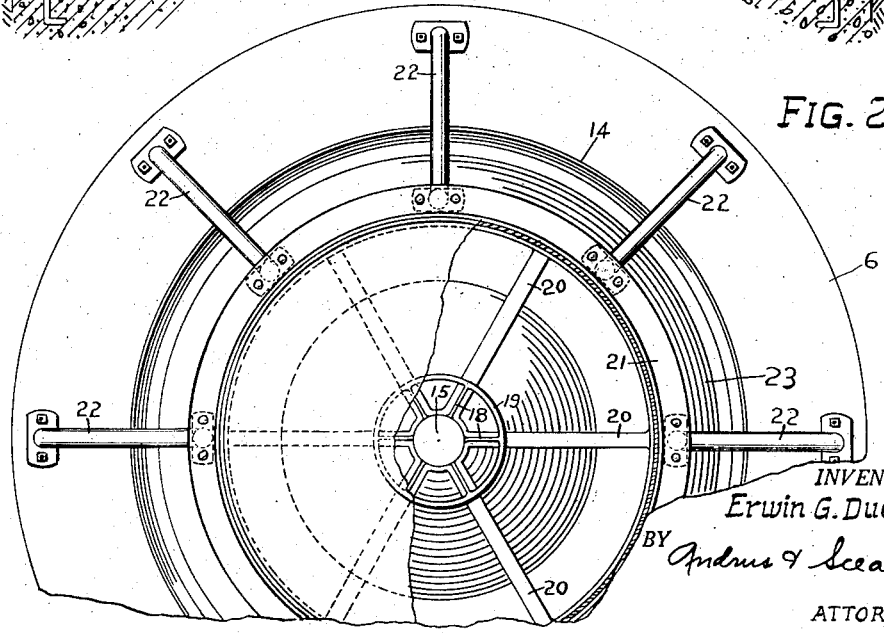

SELF-FEEDING FORAGE STRUCTURE

Erwin G. Dueringer, Milwaukee, Wis., assignor to A. O. Smith Corporation, Milwaukee, Wis., a corporation of New York Application June 30, 1952, Serial No. 296,447

1 Claim. (Cl. 119—52)

This invention relates generally to a self-feeding forage structure and particularly to a structure of this type in which chopped hay or sudan grasses are stored until fed out although the structure about to be described may be used with facility with corn silage of various grades and with corn.

Considerable difficulty has been experienced in getting silage to feed down within a silo of this type, particularly grass or hay silage, and it has been necessary to employ some mechanical agitating means to aid in this regard.

Most generally self-feeding type silos are provided with a sharp pointed cone extending upwardly from the concrete foundation of the silo for a distance substantially equal to the lower edge of the lowest cylindrical section of the silo. The bottom of the silo is usually closed by removable doors while being filled and these doors are removed when feeding out the silo so that cattle may reach into the silo circumference to remove silage stored therein.

When a silo of the above type has been filled considerable pressure is exerted by the column of silage but once the bottom doors have been removed and the cattle begin to feed the area of support for the column of silage is substantially decreased so that the unit pressure on the remaining column of silage near the center of the silo is greatly increased.

Efforts have been made to open or split this remaining column of silage which has generally taken the form of a cone with the apex thereof extending upwardly into the silage. In some instances such a cone has served very well for the purpose, especially when the silage is a bulky material such as corn, but if the silage is a fine material such as hay or grass, little if any success has evidenced itself by the use of an upstanding cone.

In storing chopped hay or grass for silage, it appears that the particles of grass or hay arrange themselves, when blown into the silo, into substantially horizontally disposed layers of material which has a tendency to compact themselves so that it is exceedingly difficult for the feeding animals to bite into the silage, or if they are able to feed into the outer portion of the silage, the column of silage extending vertically above a cone disposed in the base of the silo becomes so compact that it is impossible for the apex of the cone to pierce the silage and permit the same to slide down over the sides of the cone to positions where the animals may reach it.

If the apex of the cone is provided with a structure, preferably a cylindrical column as under the present invention which extends from the apex of the cone to adjacent the top of the silo, the compacting tendency of silage, particularly chopped hay or sudan grass, is not present, because there is no place for this silage to come to rest to resist its downward travel within the silo. Uniformity of flow of the silage downwardly is very important in a self-feeding silo and when this is attained there is little danger to the silo itself both from downward pressure from the column of silage and from lateral pressure against the cylindrical sections which comprise the silo.

It is an object of this invention to provide a self-feeding silo having a cone disposed on the foundation thereof, and with means disposed on the apex of the cone and extending upwardly therefrom to adjacent the top of the silo to prevent the compacting of silage around the apex of the cone and extending upwardly.

A further object is to provide a self-feeding silo, particularly for chopped hay and grass silage in which the silage feeds downwardly toward the base of the silo at a uniform rate through an opening ever increasing in cross-section.

Another object is to provide a self-feeding silo having cylindrical means disposed on the apex of a cone forming part of the foundation of the silo and extending between the apex of the cone to adjacent the top of the silo whereby the silage adjacent the cylindrical means is prevented from forming itself into a compact mass.

Another object is to provide a self-feeding type silo having an outwardly flared lower cylindrical section to aid in the downward passage of silage stored therein.

A still further object of the invention is to provide a self-feeding silo having a cone disposed centrally thereof and cylindrical means extending between the apex of the cone to adjacent the top of the silo whereby the weight of the silo is at least partially disposed on the apex of the cone through the cylindrical means.

In general the invention is directed to a self-feeding silo-like structure having a reinforced concrete cone or a sheet steel covered concrete cone disposed centrally of the foundation thereof with a cylindrical column extending from the apex of the cone to adjacent the top of the silo to permit uniformity of flow of silage stored within the silo, downwardly, and to permit cattle to feed themselves and thereby obviate the use of mechanical means to unload the stored silage. The body of the structure flares outwardly at the bottom to aid in the downward passage of the stored forage and the top of the cone is disposed well below the cylindrical portion of the structure so that the opening in the bottom of the structure has an ever increasing cross-section.

These and other objects will appear from the following description when read in conjunction with the accompanying drawing, in which:

Figure 1 is a vertical sectional view of the structure of the invention with parts broken away to show parts of the structure more clearly; and Fig. 2 is a top plan view with parts broken away to show certain parts of the structure.

According to the invention the silo proper comprises a plurality of superposed cylindrical sections 1 having joints 2 disposed therebetween which may, if desired, have watertight cement or other sealing compound between the sections at the joint. A top 3 encloses the top of the silo and is provided with a filling opening 4 to receive forage crops at the upper part of the silo. A watertight door 5 covers the opening 4 and keeps rain or the like from the silage in the top of the silo.

The silo is disposed above a foundation 6 of concrete or the like which is provided with a circular feeding apron 7 raised from the outer circumferential portion 8 of the foundation.

The feeding apron 7 should be of a size to permit cattle to feed into the silage for a distance substantially from the edge of the apron to closely adjacent the cone 9.

Cone 9, of reinforced concrete or of concrete covered with sheet steel 10 or the like, is centrally disposed on the feeding apron and has its apex 11 disposed upwardly to a line below the cylindrical lower end 12 of the silo. The apex of the cone may be pointed but for merely illustrative purposes in describing this invention it is shown as being circular and flat on the top for reasons hereinafter explained.

The cone 9 may be formed as an integral part of the feeding apron or it may be formed as an indepndent member and then secured to the feeding apron in any suitable manner.

Likewise the cover 10 for the cone may be extended across the feeding apron to form a cover 13 therefor or the cover for the cone and the feeding unit may be formed as individual members and both secured to each other and to the cone and feeding apron or they may be individually secured to the members they cover respectively.

The outer circumferential edge of the feeding apron is disposed upwardly to form a manger curb 14 which prevents the silage from being pushed or otherwise moved to the foundation 8 by animals which are feeding over the top of the manger curb.

It is preferable that the diameter of the base of the cone be substantially less than the diameter of the lowermost cylindrical section of the silo to provide ample space between the sides of the cone and the lowest cylindrical section for the silage to pass uninterruptedly in a downward direction onto the feeding apron.

The sides of the cone may be disposed at any desirable angle with respect to the horizontal plane of the feeding apron but experimentation has shown that the angle in question should preferably be from about forty-five degrees to about sixty degrees. The apex of the cone is disposed closely adjacent the horizontal plane of the end of the silo but does not extend upwardly into the interior of the silo.

As above described the lowermost cylindrical section of the silo is disposed above the foundation and feeding apron a sufficient height to permit cattle to walk in from the sides of the silo and to feed out the silage on the apron 7.

A cylindrical column 15 is disposed centrally of the silo and has its lower end disposed in an upturned socket 16 of a cap 17 which is disposed over and secured to the apex of the cone in any suitable manner. In like fashion the lower end of the column 15 is secured in the upturned socket.

The upper end of column 15 is angularly braced to the top 3 by a plurality of braces 18 and radially spaced from and secured to a reinforcing ring 19, secured to the inner surface of the silo adjacent the top thereof, by a plurality of radial braces 20. Braces 20 are disposed adjacent the top of the silo and offer no resistance to the downward movement of the silage when the silo is being filled. The column 15 prevents compacting of the silage and provides for free downward flow of the silage.

The lowermost section of the silo is provided on its outer surface with a reinforcing ring 21 of suitable configuration to which is secured a plurality of preferably equally spaced tangentially extending cylindrical pipes 22 or the like. These cylindrical members extend to foundations 8 and are suitably secured thereto. The supports just described suffice to support the silo against lateral pressure such as is occasioned by wind and assist the cone 9 in conjunction with the cylindrical column 15 to support the vertical weight of the silo.

The lower portion of the bottom section of the silo is formed to flare outwardly from the balance of the section as at 23 so that the cross sectional area at the bottom of the flared portion is greater than the cross sectional area at any horizontal plane of the silo. In other words, the net cross sectional area at any particular horizontal plane of the flared portion, less the cross sectional area of the cone at the base, is greatest at the bottom of the flared portion and gradually decreases to the cross sectional area of the silo proper at a point represented by a horizontal plane through the cylindrical base of the lowest section. The flared construction in combination with the cone 9 thus provides an ever increasing cross sectional area at the bottom of the silo that effects a free downward flow of the store material onto the feeding apron.

The above described invention provides means that may be incorporated into and form part of a self-feeding silo and which permits the uniform downward flow of silage to cattle feeding adjacent the base of the silo.

Various embodiments of the invention may be employed wihtin the scope of the accompanying claim.

I claim:

A storage structure for the storage of silage from which animals may self-feed which comprises a vertically disposed cylindrical silo having the lower end thereof open and being disposed a distance above the ground level sufficient for animals to extend their heads under the silo to gain access to the silage, a cover secured to the upper end of the silo, a foundation beneath the silo and having a centrally disposed raised feeding apron of substantially greater diameter than said silo, said feeding apron being provided centrally thereof with a cone, the base of which is in the same horizontal plane with the feeding apron and having its apex disposed centrally of and below the lower cylindrical end of the silo, a cylindrical column secured to the apex of the cone and extending centrally to the cover of the silo so that the weight of the silo is partially disposed on the apex of said cone, and a plurality of spaced downwardly diverging supports for lateral pressure secured at one of their respective ends adjacent the open lower end of the silo and at their opposite respective ends to the foundation outwardly of said apron, said cylindrical column being adapted to prevent compacting of the silage and to permit the free downward flow thereof and said cone being adapted to divert the vertically downward flow of the silage laterally onto the feeding apron.

References Cited in the file of this patent

UNITED STATES PATENTS

| 1,219,267 | Dickelman | Mar. 13, 1917 |
| 1,301,051 | Hart | Apr. 15, 1919 |
| 1,377,036 | Wadsworth | May 3, 1921 |
| 1,565,701 | Appel | Dec. 15, 1925 |
| 1,615,024 | Mabee | Jan. 18, 1927 |
| 1,693,611 | Mabee | Dec. 4, 1928 |
| 2,353,126 | Cecil | July 11, 1944 |
| 2,638,871 | Ruedemann | May 19, 1953 |

FOREIGN PATENTS

| 453,262 | France | Mar. 31, 1913 |
| 296,970 | Germany | Mar. 13, 1917 |

OTHER REFERENCES

Progress Report by C. H. Reed of Rutgers University, pages 3 to 9, inclusive, August 1950.

Country Gentleman, page 22, June 1951.